United States Patent [19]
Lehtisaari

[11] 3,918,746
[45] Nov. 11, 1975

[54] TRAILER AND TOWING VEHICLE COUPLER GUIDE

[76] Inventor: Lauri Lehtisaari, 6 Stewart Ave., Kapuskasing, Ontario, Canada, P5N 1S1

[22] Filed: Nov. 15, 1974

[21] Appl. No.: 524,215

[52] U.S. Cl. ................................. 280/477; 33/264
[51] Int. Cl.² ...................... G01C 5/00; B60D 1/06
[58] Field of Search ...................... 280/477; 33/264

[56] References Cited
UNITED STATES PATENTS
| | | | |
|---|---|---|---|
| 2,553,963 | 5/1951 | Dzus | 33/264 |
| 3,159,917 | 12/1964 | Whitehead | 280/477 X |
| 3,818,599 | 6/1974 | Tague | 280/477 X |

FOREIGN PATENTS OR APPLICATIONS
| | | | |
|---|---|---|---|
| 934,358 | 8/1963 | United Kingdom | 280/477 |

*Primary Examiner*—Leo Friaglia

[57] ABSTRACT

This device consists primarily of a height adjustable post threadably carried on the trailer hitch, the upper portion of the post having a red and green color so as to be sighted by the driver through the rear window, with a V-shaped rod portion which is also adjustable in height. The V-shaped rod being adjustable within a sleeve threaded to the towing vehicle adjacent to the ball that is to be aligned with the socket portion of the trailer hitch.

1 Claim, 2 Drawing Figures

U.S. Patent    Nov. 11, 1975    3,918,746
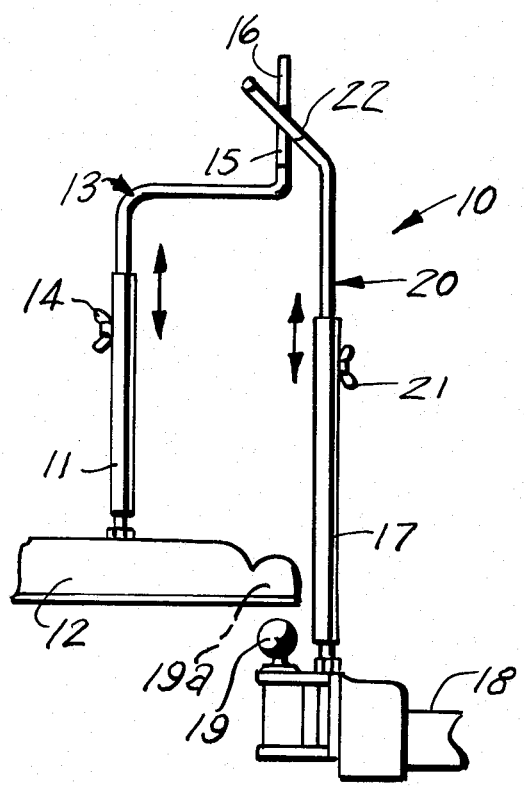
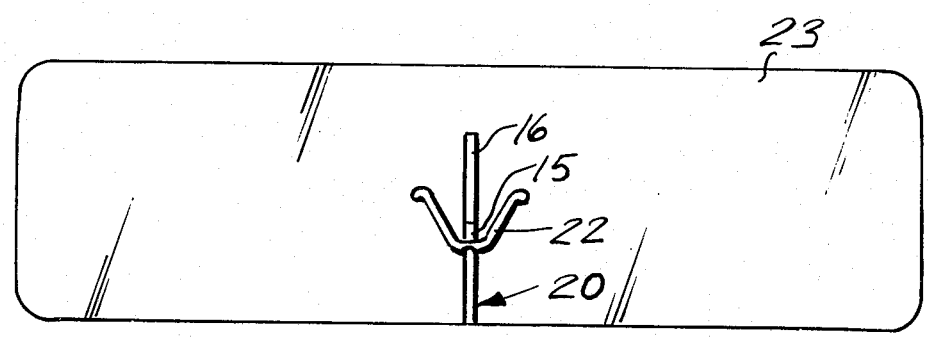

TRAILER AND TOWING VEHICLE COUPLER GUIDE

This invention relates to sighting devices, and more particularly to a trailer and towing vehicle coupler guide.

It is therefore the principal object of this invention to provide a trailer and towing vehicle coupler guide which will enable the driver of the towing vehicle, to back up the vehicle without the aid or assistance of second person, the result being, that the ball of the towing vehicle's hitch will be aligned perfectly and directly under the trailer coupler socket every time.

Another object of this invention is to provide a device of type described, which will be of such structure, so as to use the principle of the open sights on a firearm.

Another object of this invention is to provide a device of the type described which will have the upper elements elevatable to a desired elevation so as to enable the driver to sight the alignment of the device through the rear windshield of the vehicle.

A further object of this invention is to provide a device of the type described, which will employ a threaded sleeve, one for the trailer hitch having the socket portion and the other for the towing vehicle having the ball portion, the sleeves slideably receiving post or rod means, the post having its end portion colored with a bright red and green and the rod portion of the sleeve of the towing vehicle will a V-shaped upper end which will enable the driver to visually detect when the ball and socket in alignment preparatory for hitching the trailer to the towing vehicle.

Other objects of the invention are to provide a trailer and towing vehicle coupler guide, which is simple in design, inexpensive to manufacture, rugged in construction, easy to use and efficient in operation.

These and other objects will be readily evident upon a study of the following specification and the accompanying drawing, wherein:

FIG. 1 is a side view of the present invention shown in elevation with the two height adjustable members shown in alignment.

FIG. 2 is a view looking through the rear windshield of the vehicle showing the alignment of the components of the device.

According to this invention, a trailer and towing vehicle coupler guide 10 is shown to include a sleeve 11 threadable into the trailer 12 hitch portion, the sleeve slideably receiving a post member 13 which is adjustable by means of thumb screw 14. The upper extremity of post 13 is painted with a bright green 15 just below the extreme end 16 which is painted a bright red 16. A second sleeve 17 is threadably carried by the towing vehicle 18, the sleeve 17 being spaced and in alignment with the ball 19 which is to be received within the socket portion 19a when they are properly aligned with each other. A rod 20 is slideably carried within sleeve 17 and is adjustable by means of thumb screw 21. The upper portion of rod 20 is bent at an angle and is V-shaped 22 in configuration so as to provide accurate sighting for the driver in aligning the towing vehicle 18 with the trailer 12.

In use, the V-shaped end 22 of rod 20 is guided by the driver backing the vehicle, until the post 13 aligns with the center of the V-shaped end 22, but not quite touching it. When the above mentioned occurs, the driver will stop the vehicle and then drop the socket 19a portion, onto the ball 19 portion attached to the towing vehicle 18.

It shall be noted that for proper height adjustment, the green end portion 15 should be seen above the V-shaped end 22 sight by the driver.

It shall also be noted, that an added feature may be a warning light, or other warning signal may be utilized with device 10 so as to alert the driver when he has backed up the towing vehicle correctly to spot the ball 19 exactly under the socket portion 19a. This signal may be operated electrically, by battery means or the towing vehicle's or trailer's electrical source.

What I claim is:

1. A trailer and towing vehicle coupling facilitating guide comprising an elongated first sleeve means adapted to be secured to the trailer hitch portion at one end and slidably adjustably receiving an elongated sighting post means to protrude from its other end, a second elongated sleeve means adapted to be secured to the towing vehicle at one end and slidably adjustably receiving a sighting rod means to protrude from its other end, said rod means having a V-shaped upper end portion for sighting the upper end of said post means, each said first and second sleeve means provided with thumb screw means for securing the respective lower ends of said post means and rod means, said post means having a bright color coating at its upper extremity followed by a contrasting bright color coating therebelow to enable easy sighting of said post means within the confines of the apex of the V-shaped end portion of said rod means, said first sleeve means and mating lower portion of said post means adapted to extend vertically relative to the trailer, the upper portion of said post means including a horizontal portion adapted to extend forwardly relative to the trailer hitch to a position directly above the trailer hitch coupling and a vertical portion connected to the forward end of said horizontal portion and positionable to be in vertical alignment with said trailer hitch coupling, said second sleeve means and mating lower portion of said rod means adapted to extend vertically relative to the towing vehicle from a position adjacent but forwardly of the towing vehicle coupler, the V-shaped upper end portion of said second sleeve means being bent at an angle so as to be orientable to extend upwardly and rearwardly above said towing vehicle coupler in a position to receive the colored upper end portion of said post means within the confines of the apex of said V-shaped end of the rod means.

* * * * *